Patented Jan. 27, 1953

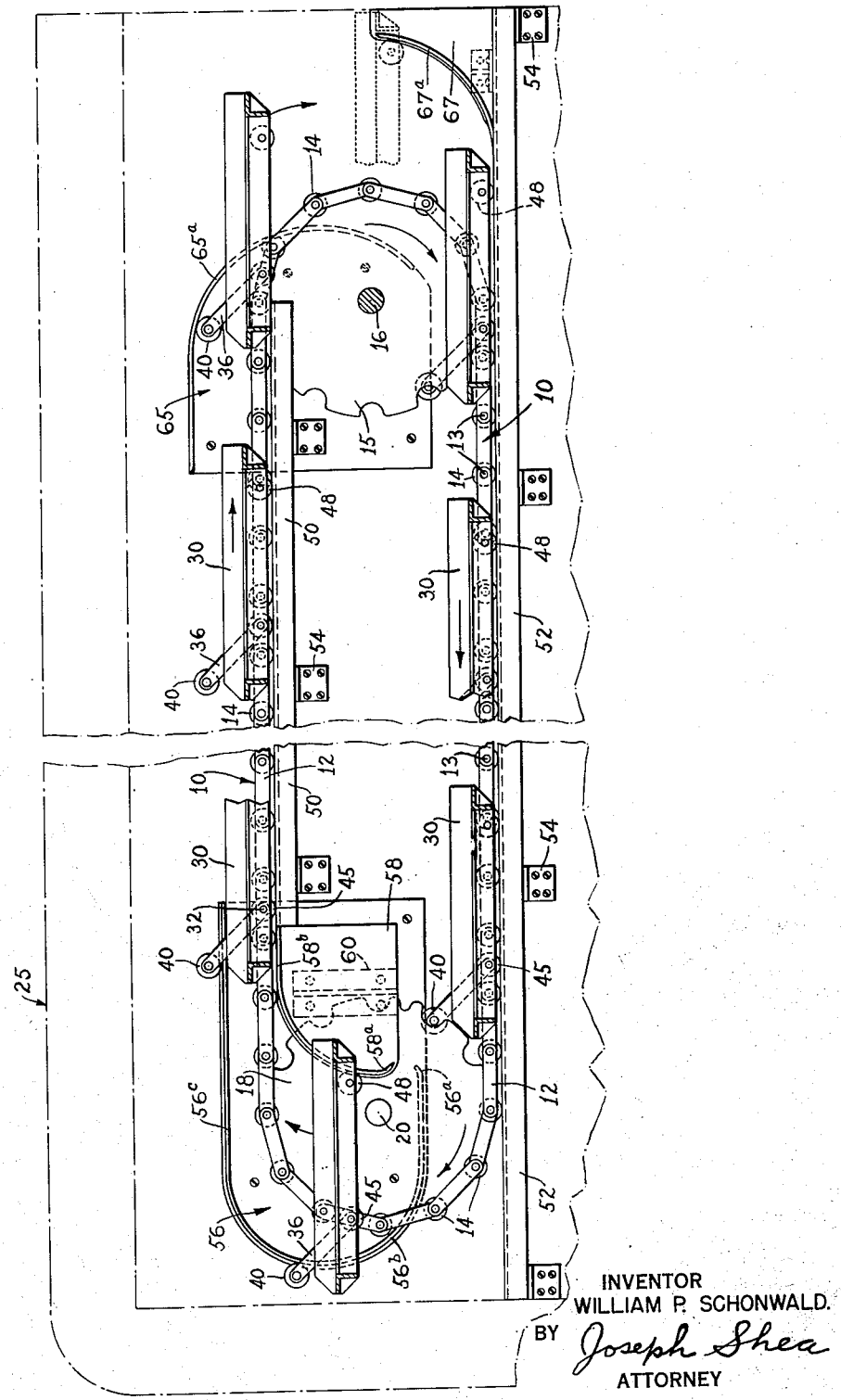

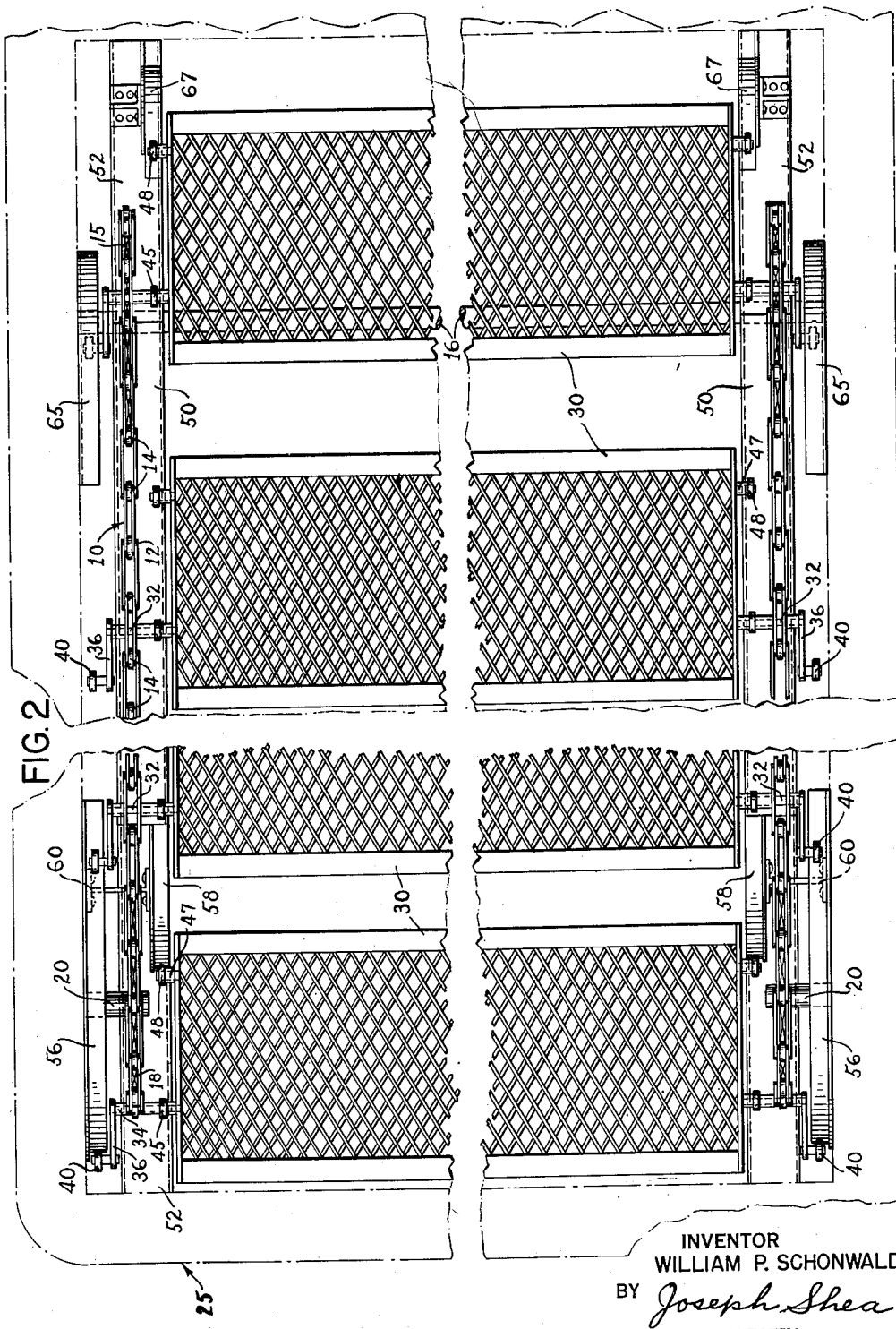

2,626,700

UNITED STATES PATENT OFFICE 2,626,700

OVEN CONVEYER HAVING GUIDED TRAYS

William P. Schonwald, West Haven, Conn., assignor to American Machine & Foundry Company, a corporation of New Jersey Application December 4, 1947, Serial No. 789,585

3 Claims. (Cl. 198—138)

This invention relates to bakery ovens, more particularly to the type of ovens having trays which are pivotally mounted on a conveyor located within the oven.

One of the main objects of this invention is to provide a simplified stabilizer for maintaining the trays in a horizontal position as they are moved in an arcuate path around the sprockets which guide and drive the conveyor. Formerly an additional sprocket chain connected to the trays and running over additional sprockets was required. Or else additional guide sprockets were arranged to engage and stabilize the trays as they were moved around the conveyor sprockets, or cam-operated stabilizer arms were employed for this purpose. My improved stabilizer has fewer moving parts and less maintenance is required to obtain satisfactory operation thereof.

In the accompanying drawings which form a part of this specification:

Fig. 1 is a longitudinal sectional view of a tray conveyor equipped with my stabilizer, the outline of the oven in which it is installed being indicated in dotted lines; and Fig. 2 is plan view of the same.

Referring to the drawings which illustrate a tray conveyor of conventional construction and a stabilizer embodying my invention for maintaining the trays in a horizontal position. The conveyor 10 includes a pair of endless sprocket chains 12 which may be of any suitable construction such as a standard roller-chain having pairs of links pivotally connected at their ends by pins 13 on which are loosely mounted rollers 14. Each sprocket chain 12 runs over a drive sprocket 15 mounted on the drive shaft 16 and an idler sprocket 18 mounted on one of a pair of stub shafts 20. The drive shaft 16 and the stub shafts 20 are suitably supported in the side walls of the oven 25. Drive shaft 16 is intermittently driven by suitable mechanism (not shown) to advance successive trays to the loading station. Since the oven may be of any suitable construction, further description thereof is deemed unnecessary.

An endless series of trays 30 is provided on which the pans containing the goods to be baked are delivered through a door (not shown) in one end of the oven. Each end of the trays 30 is connected to the sprocket chains 12 by trunnions formed by pins 32 passing through portions of the sprocket chain 12 intermediate, the pins 13 connecting the links thereof together. One end of these pins 32 is rigidly connected to trays 30 or suitably secured thereto at one side of the central longitudinal axis thereof. On the other end of each pin 32 is suitably secured the hub 34 of a stabilizer arm 36 on which is rotatably mounted a roller 40.

On each of the pins 32 is rotatably mounted a roller 45. Adjacent the other side of trays 30 are provided a pair of studs 47 secured in the ends of the trays on which rollers 48 are rotatably mounted. The rollers 45 and 48 on each tray, while it is being moved along the upper and lower horizontal runs of the conveyor, ride on an upper horizontal track 50 and a lower horizontal track 52. Thus the trays will be maintained in a horizontal position while the rollers 45 and 48 thereof engage either the track 50 or track 52. Tracks 50 and 52 are supported on brackets 54 secured to the side walls of the oven or may be supported in any other suitable manner.

Since the trunnions of trays 30 are offset from the central longitudinal axes of the trays, the weight of the trays will maintain the rollers 45 and 48 in engagement with the track 52 while the rollers 40 on stabilizer arms 36 engage the horizontal track section 56a of shoes 56 and ride along the same. When the trays are moved upwardly around the sprockets 18, the rollers 45 and 48 leave track 52 and rollers 40 engage the arcuate track sections 56b of shoes 56. The weight of the trays then maintains the rollers in engagement with track sections 56b. The track sections 56b have the proper shape to maintain the trays in a horizontal position as the trays are moved upwardly to the loading position shown at the left of Fig. 1. Just before the tray reaches the loading position the rollers 48 engage the arcuate track sections 58a of the shoes 58 which also have the proper shape to maintain the trays in a horizontal position. Since the rollers 40 and 48 ride along the track sections 56b and 58a respectively when the tray reaches the loading station, movement of the tray while it is being loaded will be prevented. Shoes 58 are suitably supported from the side walls of the oven by channels 60.

During the continued upward movement of each tray upwardly from its loading station, the rollers 40 ride on to the horizontal track section 56c of shoes 56 while the rollers 48 thereof ride on to the horizontal sections 58b of the shoes 58. These sections of shoes 56 and 58 maintain the tray in a horizontal position until the rollers 45 and 48 engage the upper track 50.

As the tray reaches the other end of track 50, the rollers 40 engage the track 65a of shoes 65 while rollers 45 and 48 ride off track 50. Shoes 65 are suitably secured to the side walls of the oven. The weight of the trays then maintains the rollers 40 in engagement with shoes 65 whereby the tray will be maintained in a horizontal position as it is carried downwardly around the sprockets 15, the track 65a having the required shape for this purpose. Before the rollers 40 ride off the lower ends of shoes 65 the rollers 40 engage the track 67a of shoes 67. These shoes 67 may be suitably secured to the side walls of the oven. The tracks 67a of shoes 67 have a predetermined shape to maintain the tray in a horizontal position after the rollers 40 ride off the shoes 65. It may be noted that the weight of the tray will maintain the rollers 48 in engagement with tracks 67a until rollers 45 and 48 engage with the lower tracks 52. The rollers 45 and 48 then ride along tracks 52 and maintain the tray in horizontal position until they approach the sprockets 13 and are again moved upwardly to the loading station.

As many changes could be made in the above construction, and many apparently widely different embodiments of this invention could be made without departing from the scope of the claims, it is intended that all matters contained in the above description or shown in the accompanying drawings shall be interpreted as illustrative and not in a limiting sense.

What is claimed is:

1. An endless conveyor suitable for use in an oven comprising a pair of endles conveyor chains, sets of sprockets over which said chains are guided, said chains having horizontal runs between said sprockets, a series of trays, a trunnion at each end of said trays pivotally mounted in said chains, the trunnions of each tray being aligned with each other and located at one side of the central longitudinal axis of each tray, a pair of guide rollers rotatably mounted on the end of each tray at the other side of the central longitudinal axis thereof and positioned between the tray and the chain, horizontal tracks extending along the horizontal runs of one of said chains and arranged to underlie and engage said guide rollers while the trays are moved along the horizontal runs of said chains whereby said rollers will be maintained in engagement with said tracks by the weight of said trays, a stabilizing member connected to one of the trunnions of each tray and a stationary guide adjacent one end of said horizontal tracks and having a track of a predetermined shape adapted to engage the stabilizing members of successive trays while the guide rollers thereof engage one of said tracks and then guide the stabilizing members in a predetermined path to maintain the trays in a horizontal position as they are moved in an arcuate path part of the way around the adjoining sprockets whereby the stabilizing members will be maintained in engagement with the track of said stationary guide by the weight of said tray after the guide rollers thereof ride off said horizontal track, and a pair of secondary guides having tracks of predetermined shape to engage and support the guide rollers on each tray during the remainder of the path around the sprocket and thereby maintain the trays in a horizontal position.

2. An endless conveyor suitable for use in an oven comprising a pair of endless conveyor chains, sets of sprockets over which said chains are guided, said chains having horizontal runs between said sprockets, a series of trays, a trunnion at each end of said trays pivotally mounted in said chains, the trunnions of each tray being aligned with each other and located at one side of the central longitudinal axis of each tray, a pair of primary rollers on one side of the central longitudinal axis of the trays and mounted on each of said trunnions, a pair of secondary rollers on the other side of the central longitudinal axis of each tray and rotatably mounted at the ends thereof, and a horizontal track underlying the upper horizontal run and engaging said primary and secondary rollers whereby the secondary rollers will be maintained in engagement with the horizontal track by the weight of the trays, said horizontal track having a portion forming a continuation thereof curving downwardly and so constructed and arranged so as to receive and guide the secondary roller during the tray's ascent with the roller held in contact with the curved portion of the track by the weight of the tray and the tray held in a horizontal position.

3. An endless conveyor suitable for use in an oven comprising a pair of endless conveyor chains, sets of sprockets over which said chains are guided, said chains having horizontal runs between said sprockets, a series of trays, a trunnion on each end of said trays pivotally mounted in said chains, the trunnions of said tray being aligned with each other and located at one side of the central longitudinal axis of each tray, horizontal tracks extending along the horizontal run of one of said chains, a pair of primary rollers rotatably mounted on said trunnions and adapted to engage said horizontal tracks, a pair of secondary guide rollers rotatably mounted at the end of each tray on the other side of the central longitudinal axis thereof, an angularly disposed stabilizing member connected to one of the trunnions of each tray on the side of the chain distal from the tray, and a stationary guide adjacent one end of said horizontal tracks and having a track of predetermined shape adapted to engage the stabilizing member of successive trays while the secondary guide rollers thereof engage one of said tracks and then guide the stabilizing members in a predetermined path to maintain the trays in a horizontal position as they are moved in an arcuate path part of the way around the adjoining sprockets whereby the stabilizing members will be maintained and engaged with the track and said stationary guide by the weight of said tray after the secondary guide rollers thereof ride off said horizontal track, and a pair of secondary guides having tracks of predetermined shape to engage and support the secondary guide rollers on each tray during substantially the last-half of their arcuate path around the adjoining sprocket whereby said trays may be maintained in a horizontal position throughout the entire traverse of the endless conveyor.

WILLIAM P. SCHONWALD.

REFERENCES CITED

The following references are of record in the file of this patent:

UNITED STATES PATENTS

| Number | Name | Date |
| --- | --- | --- |
| 719,890 | Shaw | Feb. 3, 1903 |
| 856,460 | Frick | June 11, 1907 |
| 1,135,316 | Olson | Apr. 13, 1915 |
| 1,194,932 | Baker | Aug. 15, 1916 |
| 1,871,346 | Savy | Aug. 9, 1932 |
| 2,304,026 | Schonwald | Dec. 1, 1942 |
| 2,308,686 | Harber et al. | Jan. 19, 1943 |